(12) United States Patent
Lipton et al.

(10) Patent No.: US 7,720,923 B2
(45) Date of Patent: *May 18, 2010

(54) METHOD AND SYSTEM FOR NOTIFICATION OF LOCAL ACTION REQUIRED TO CONTENTS OF ELECTRONIC MAIL MESSAGE

(75) Inventors: Steven Jay Lipton, Flower Mound, TX (US); James Wesley Seaman, Falls Church, VA (US); Carl Phillip Gusler, Austin, TX (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/190,622

(22) Filed: Aug. 13, 2008

(65) Prior Publication Data

US 2008/0301252 A1    Dec. 4, 2008

Related U.S. Application Data

(63) Continuation of application No. 10/829,570, filed on Apr. 22, 2004, now Pat. No. 7,475,114.

(51) Int. Cl.
*G06F 15/13* (2006.01)
(52) U.S. Cl. .......... 709/206; 709/203; 709/204; 709/205; 709/218; 709/219; 370/265
(58) Field of Classification Search ........... 709/203, 709/204, 205, 206, 218, 219; 370/265
See application file for complete search history.

(56) References Cited

U.S. PATENT DOCUMENTS

| 5,476,420 | A | | 12/1995 | Manning | |
|---|---|---|---|---|---|
| 6,147,977 | A | * | 11/2000 | Thro et al. | 370/265 |
| 6,314,454 | B1 | * | 11/2001 | Wang et al. | 709/206 |
| 6,934,738 | B1 | * | 8/2005 | Furusawa et al. | 709/206 |
| 2002/0143881 | A1 | | 10/2002 | DeLaCruz | |
| 2002/0194280 | A1 | * | 12/2002 | Altavilla et al. | 709/206 |
| 2004/0225718 | A1 | * | 11/2004 | Heinzel et al. | 709/206 |

FOREIGN PATENT DOCUMENTS

| JP | 2002063113 A2 | 2/2002 |
|---|---|---|
| JP | 2002164911 A2 | 6/2002 |
| WO | WO0197432 A2 | 12/2001 |

* cited by examiner

*Primary Examiner*—Jinsong Hu
(74) *Attorney, Agent, or Firm*—Schmeiser, Olsen & Watts; William H. Steinberg

(57) ABSTRACT

The present invention provides a method and system to alert the recipient of an electronic message of some action that is required from the recipient. The invention also provides a method to alert the sender of the electronic message of the completion of the action required in the original electronic mail message. In the method of the present invention, the originator or recipient of an electronic mail message can choose to designate the message as one that requires an action by the message recipient. The recipient will notice the 'Action Required' icon and will be alerted to the fact that an action is required with this message. At the completion of the action, the sender of the original message will receive a notification that the requested action has been taken by the recipient.

18 Claims, 15 Drawing Sheets

```
To: _____          Send ——35
Subject: _____          Reply ——36
Cc: _____          Reply All ——37
Bcc: _____          Delete ——39
Attachment: _____          Forward ——38
Action
Required
                34
_____
_____
_____
```

40 points to "Action Required"

FIG. 8

```
o Send    o Send/File    o Save Draft    o Address    o Delivery Options
```

From: John Doe

To: Jane Doe
cc:
bcc:
Subject: Staff Meeting on Friday

A    From: Jane Doe    09/10/2002    10:03:06 PM    Staff Meeting on Friday

FIG. 11b

A    From: Jane Doe    09/10/2002    10:03:06 PM    Staff Meeting on Friday

FIG. 11c

```
o Send    o Send/File    o Save Draft    o Address    o Delivery Options
```
|  |  |
|---|---|
| From: John Doe | To: Jane Doe |
|  | cc: |
|  | bcc: |
|  | Subject: Staff Meeting on Friday |

FIG. 15

(U) Urgent, Response Required Today
(W) Week, Response Required this Week
(M) Month, Response Required this Month
(I) Information, Read at Leisure

FIG. 16

| | | | | |
|---|---|---|---|---|
| (W) | Jane Doe | 09/10/2002 | 10:03:06 AM | Will you be attending the Staff Meeting on Friday |
| (U) | John Lee | 09/10/2002 | 11:18:22 AM | Hourly estimated due by close of business tomorrow |
| (I) | Ted Smith | 09/10/2002 | 12:26:36 PM | Interesting article on New Disk Drives |
| (M) | Ron Miller | 09/10/2002 | 14:10:55 PM | Business guidelines must be Reviewed this Monday |

FIG. 17

METHOD AND SYSTEM FOR NOTIFICATION OF LOCAL ACTION REQUIRED TO CONTENTS OF ELECTRONIC MAIL MESSAGE

CROSS-REFERENCE TO RELATED APPLICATIONS

This application is a continuation of the application Ser. No. 10/829,570 filed on Apr. 22, 2004, U.S. Pat. No. 7,475,114, issued Jan. 6, 2009.

FIELD OF THE INVENTION

The present invention relates to a method and system for receiving and responding to electronic messages and in particular to a method and system for identifying an electronic message that requires local action by the message recipient, notifying a recipient of the local action required on the message and notifying message sender of the completion of the local action.

BACKGROUND OF THE INVENTION

Email communications are an integral part of any business, and widely used outside of business as well. This being the case, ease of use and best of breed functionality are imperative in modern email systems. Many user interface enhancements have been added to email systems over the past several years; however, room for improvement continues to exist.

Although several new technologies currently compete as the most ubiquitous tool in business communications, email remains one of the most-used communications tools for both business and personal users. Widespread availability, ease of use, and functionality are key components, which hold email in front of other developing communications methods; however, as new technologies compete for the top spot, email applications must continue to build upon the strong foundation currently in place to maintain their edge. By any current standard, email applications would have to be rated as mature technology; however, if improvements in email applications slow, and other tools continue to improve, loss of market share will undoubtedly result.

One key feature missing in legacy email tools is an "action required/action taken" management system to assist the user in responding to email messages. With legacy email functionality, it is only with great difficulty that the user can open his or her in-box and determine which messages require action, and what should be the respective priority of each of the messages requiring action. During busy periods this information is imperative, as the user may otherwise viewed as unresponsive, when in fact the user may simply be responding to messages of lower priority. The average email user receives many tens/hundreds of email messages every day/week. It is currently a cumbersome task to track which messages a user should respond to in the time allotted, and which messages can wait for a reply at a later time. Ideally the user would want to respond to the most important messages first, while leaving lower priority messages for response during less busy periods of the day/week. A user's in-box may at any given point contain many "active" documents, and the process of identifying messages which the user must reply to, or messages where the user is dependent upon an action from a remote party, is manual and inefficient. An example of this problem could be the case where a user sends an email to his/her manager requesting approval of an expense report. With legacy email applications the user is not informed when an action has occurred, and he/she must manually follow up to ensure that the appropriate action has taken place.

At the present time, Lotus Notes provides some alternatives that address this issue. However, these email applications have limited functionality in the area of notifying a user of need to perform an action in response to a received message. FIG. 1 shows delivery options available to the sender of an email message that will prompt the recipient of the message. This display contains basic information for the recipient and includes a 'Please reply by' date and an expiration date. FIG. 2 shows another example of delivery options available for the sender. This display has more options, but is still fairly basic in its capabilities. FIG. 3 shows a display with more options, but only allows for one response by the recipient. Since the message link is generated by the system it is not possible for the sender to customize or control the nature of the response by the recipient. FIG. 4 is a display that gives the recipient more choices for a response to the sender. However, the responses are "canned" and very limited. It is not obvious that the general end-user would be able to easily create these custom form letters. FIG. 5 is an example of a current display for a local action required for a received email.

Therefore, there remains a need for a method and system at the recipient location that can notify an electronic mail message recipient of the requirement to reply to the received message and the priority requirements surrounding such a message reply. In addition, a system is needed in which the user can be assisted through visual cues as to which messages need immediate response, and which need response but have a lower priority.

SUMMARY OF THE INVENTION

It is an objective of the present invention to provide a method that will enable the creator of an electronic message to designate that message as one for response by the message recipient.

It is a second objective of the present invention to provide a method that will notify the recipient of an electronic message of an action required by that recipient in response to the contents of the received message.

It is a third objective of the present invention to provide a method to identify a received electronic message as one that requires an action by the electronic mail recipient.

It is a fourth objective of the present invention to provide a method that will notify the sender of an electronic message when the recipient of that message has taken an action in response to the contents of the message.

It is a fifth objective of the present invention to provide a method that will allow the recipient of an email message significant flexibility in categorizing and prioritizing inbox messages.

It is a sixth objective of the present invention to provide a method that automates the changing of the prioritization of the message markers, so that the most important message is always identified.

The present invention provides a method and system to alert the recipient of an electronic message of some action that is required from the recipient. The invention also provides a method to alert the sender of the electronic message of the completion of the action required in the original electronic mail message. In the method of the present invention, the originator or recipient of an electronic mail message can choose to designate the message as one that requires an action by the message recipient. This message designation could be a flag or icon embedded into the message. The recipient will notice the 'Action Required' icon and will be alerted to the fact that an action is required with this message. Once the recipient reads the message, the recipient will act upon the request in the message. At the completion of the action, the sender of the original message will receive a notification that the requested action has been taken by the recipient.

The present invention also enables the message recipient to prioritize message in the inbox such that the messages requiring more immediate responses are identified and listed foremost in a display. As part of this prioritization, various markers could be placed with message in accordance with the importance or characterization of the message as determined by the recipient. As a result, the recipient will be able to better manage the messages and give prompt attention and responses to the received messages. Better management of the messages and the associated markers means better time management. As a side benefit, better management of the messages means that the end-users will quickly be able to determine and mark messages that can be deleted from the inbox. With this ability, then the end-user will better be able to manage the limited email storage, which will contribute to the optimization of scarce corporate storage resources.

DESCRIPTION OF THE DRAWINGS

FIG. 8 is an illustration of a screen for a typical electronic message transmission.

FIG. 11a is a sender's view of an outgoing message.

FIG. 11b is a view of the information in a message that has been sent from the sender's location.

FIG. 11c is a view of the information in a message that has been sent to the sender's location indicating the completion of the action in response to the original message.

FIG. 15 is a diagram of an incoming message.

FIG. 16 is a diagram of message priority marker options for received messages.

FIG. 17 is a diagram of messages listed by priority and designated by markers.

DETAILED DESCRIPTION OF THE INVENTION

Figure 1:
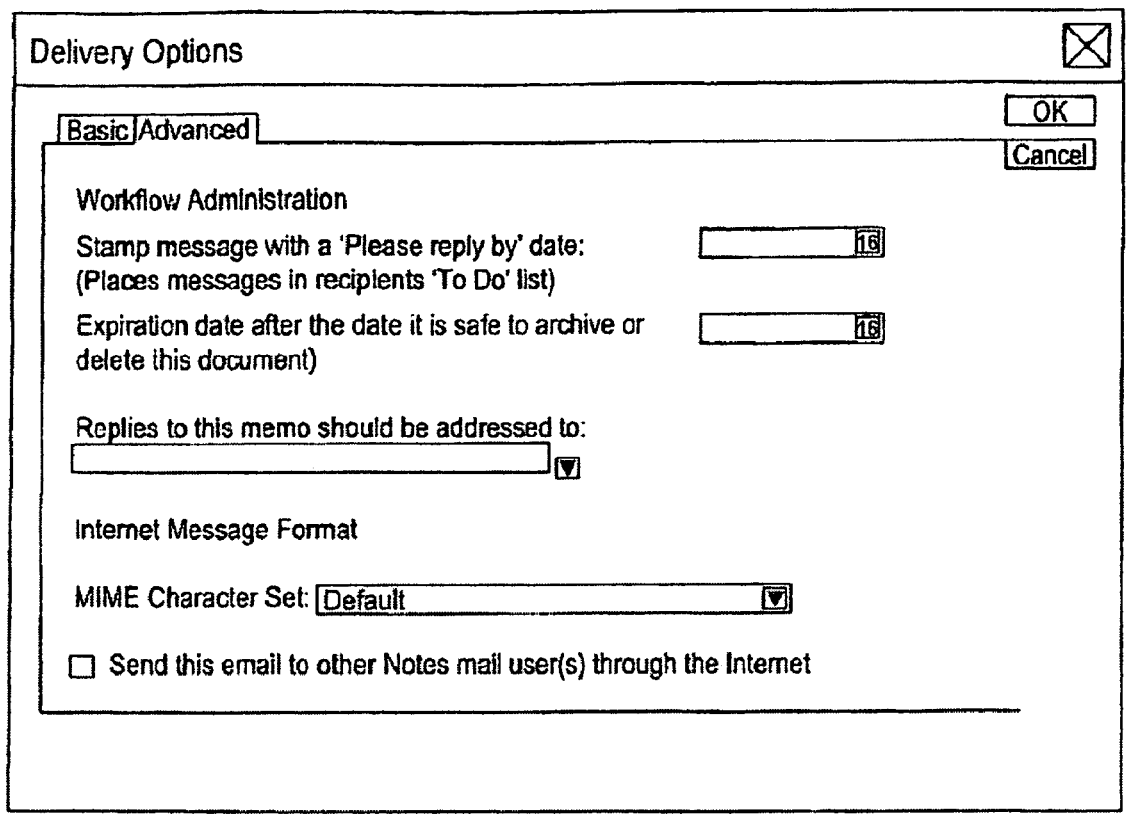
FIG. 1 is an example of delivery options available to the electronic message sender, which will prompt the recipient of the email.
Figure 2:
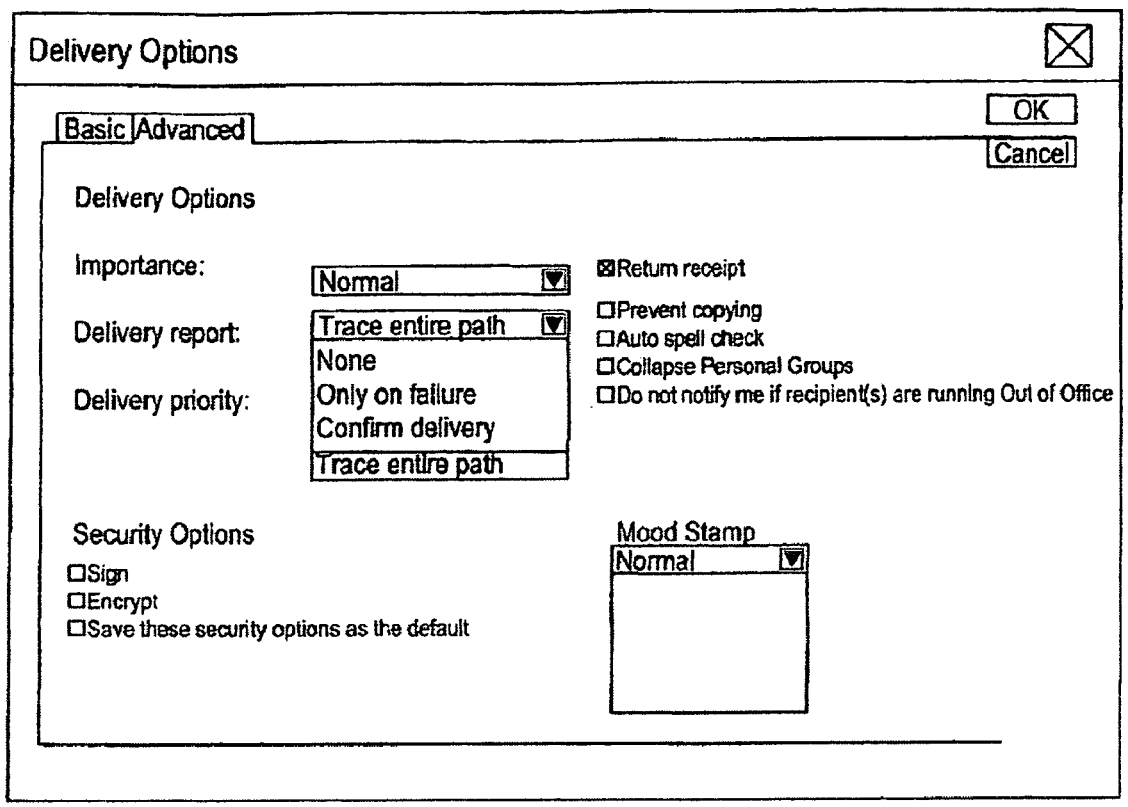
FIG. 2 is an example of delivery options for electronic mail messages that are available to the sender.
Figure 3:
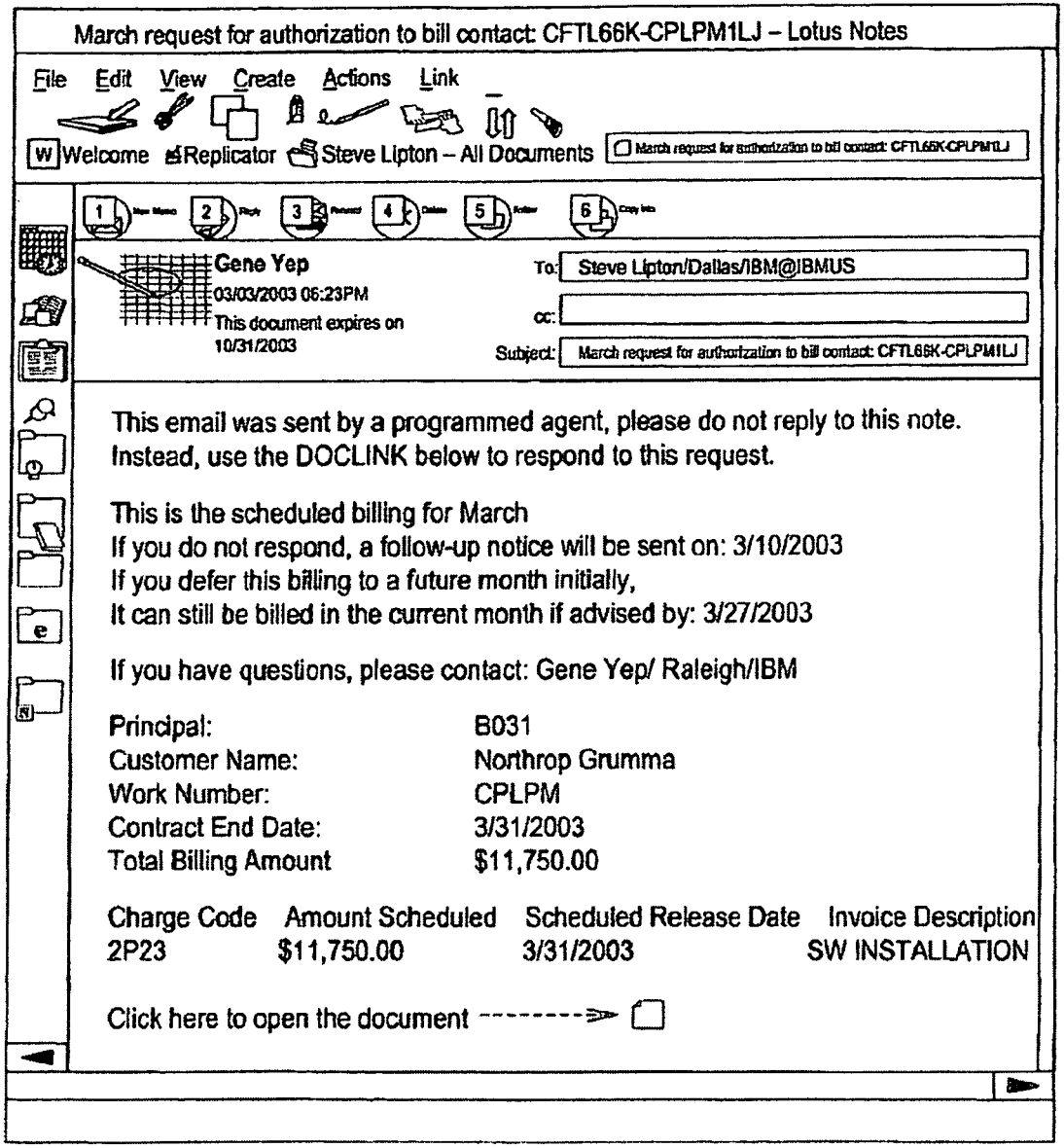
FIG. 3 is an example of recipient options when responding to an email message.
Figure 4:
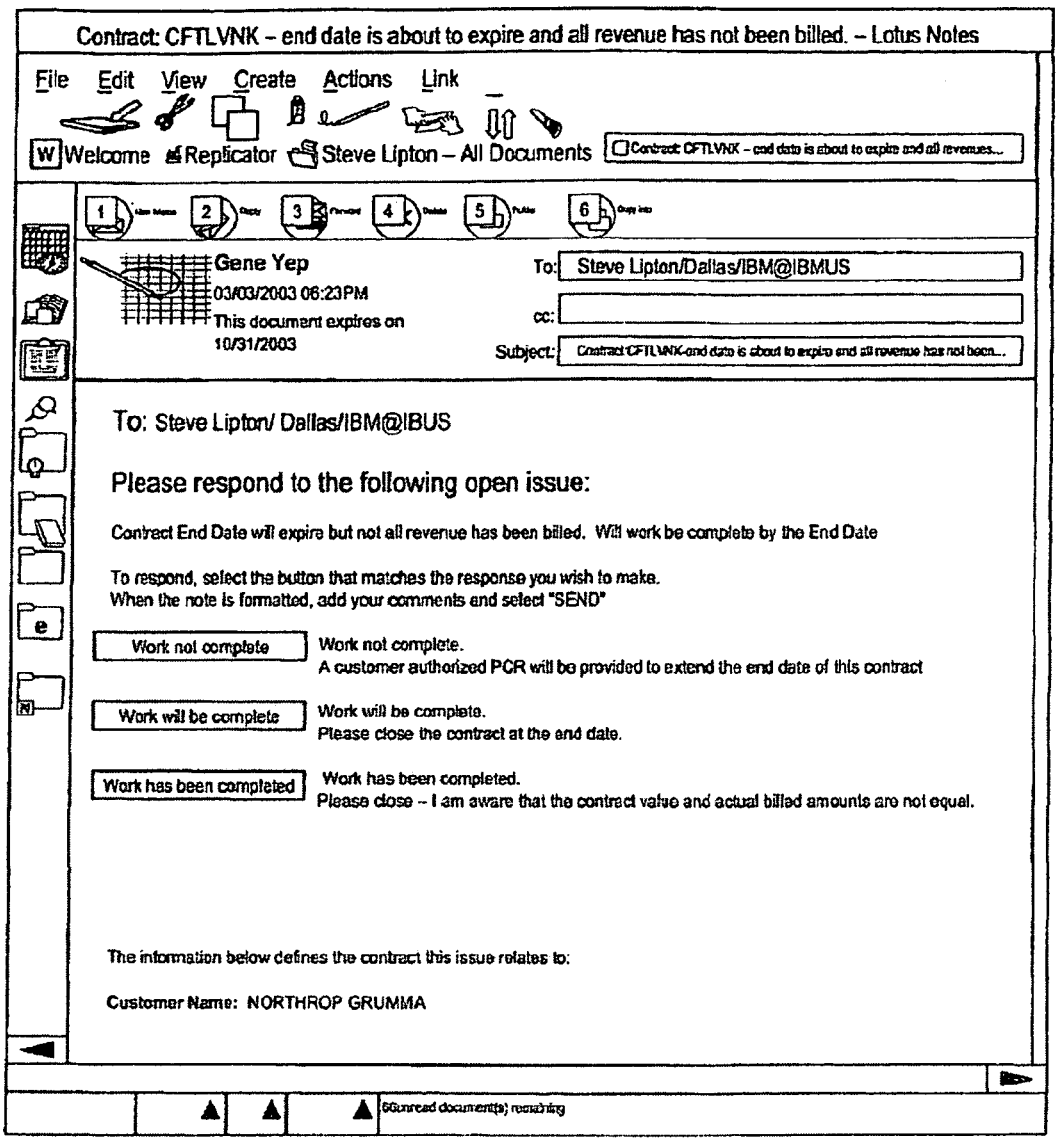
FIG. 4 is an example of more recipient options when responding to an email message.
Figure 5:
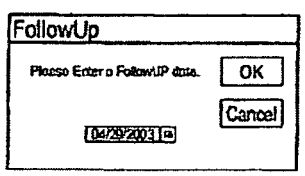
FIG. 5 is an example of a current display for a local action required for a received email.
Figure 6:
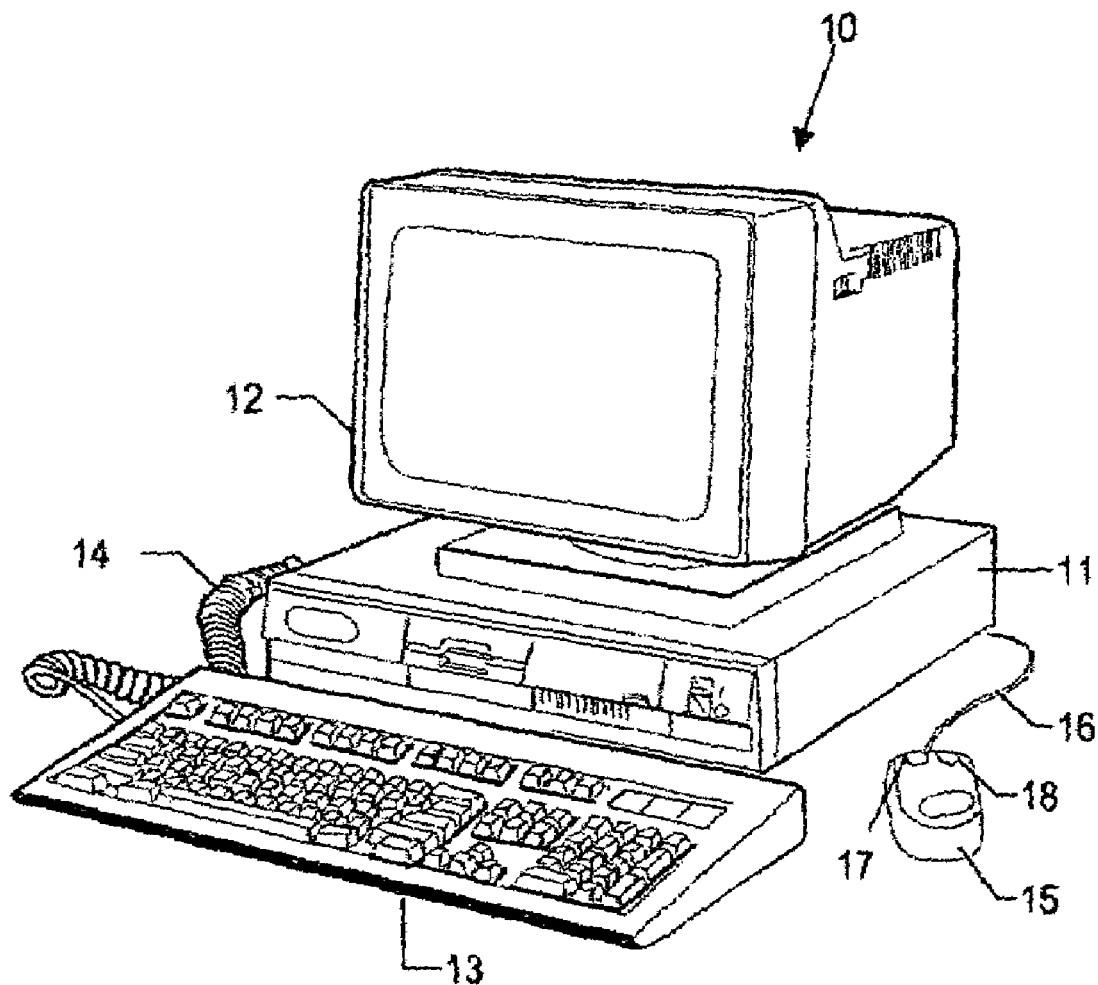
FIG. 6 is a conventional computing device used that can be used to transmit and receive electronic messages via a computer network.

Electronic mail message transmissions occur over computing devices, usually personal computers, connected to a communication network. With reference now to FIG. 6, there is depicted a pictorial representation of computing device 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

The method of the present invention may be implemented in a global computer network environment such as the Internet. With reference now FIG. 7, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 7:
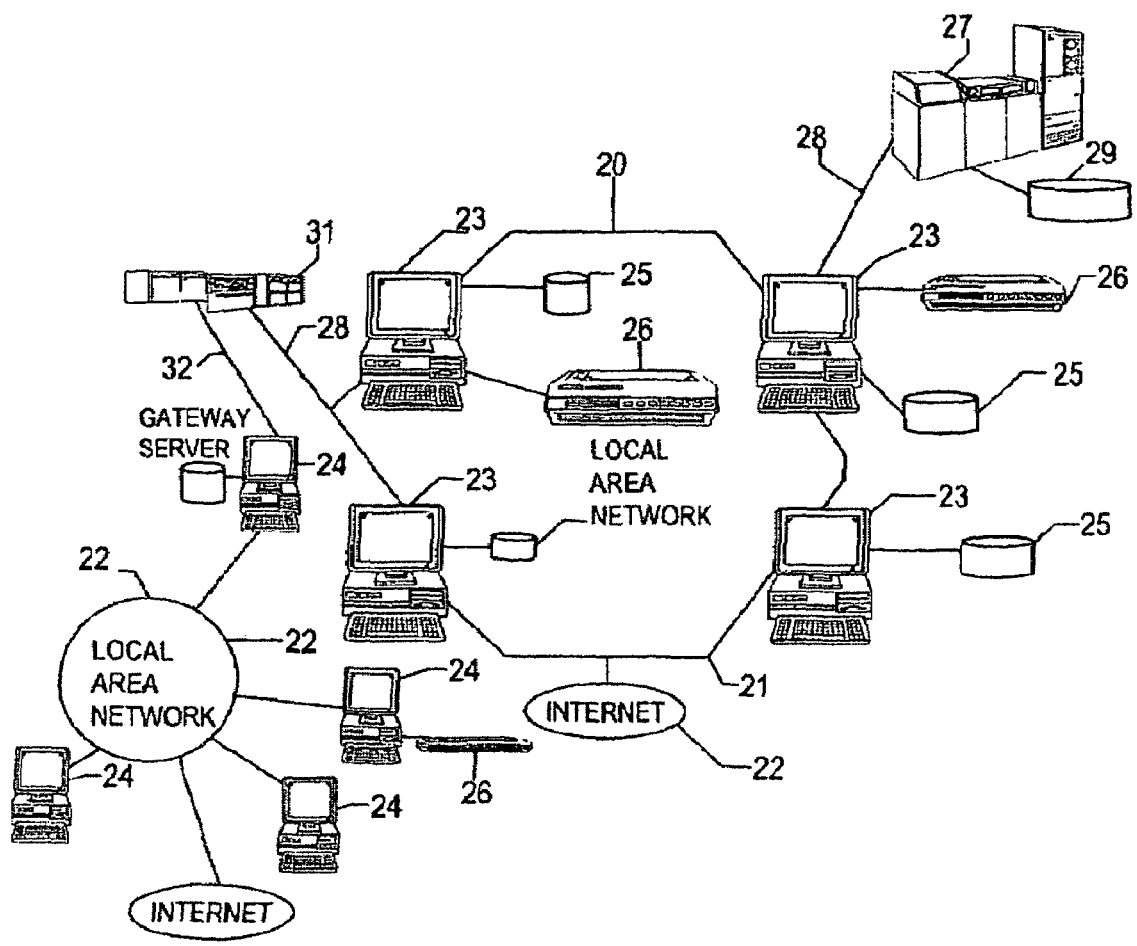
FIG. 7 is a diagram of a computer network over which electronic messages may be transmitted between a sender and receiver in the present invention.

Still referring to FIG. 7, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS), which serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

FIG. 8 illustrates a typical screen during the creation of an electronic message. As shown, there is a text screen 34 for the message and the standard party and subject information To, Subject, Cc, Bcc and Attachments. In addition, there are control icons that allow a sender certain options before and during the transmission of the message. The icons can include send 35, Reply 36, Reply All 37, and Forward 38 and Delete 39. The screen for the present invention could contain an additional Action Required icon 40. This icon would activate an "Action Required by Receiving Party" routine. This routine would incorporate information into the message that would alert the message recipient of a required action based on the contents of the received message.

Figure 9:
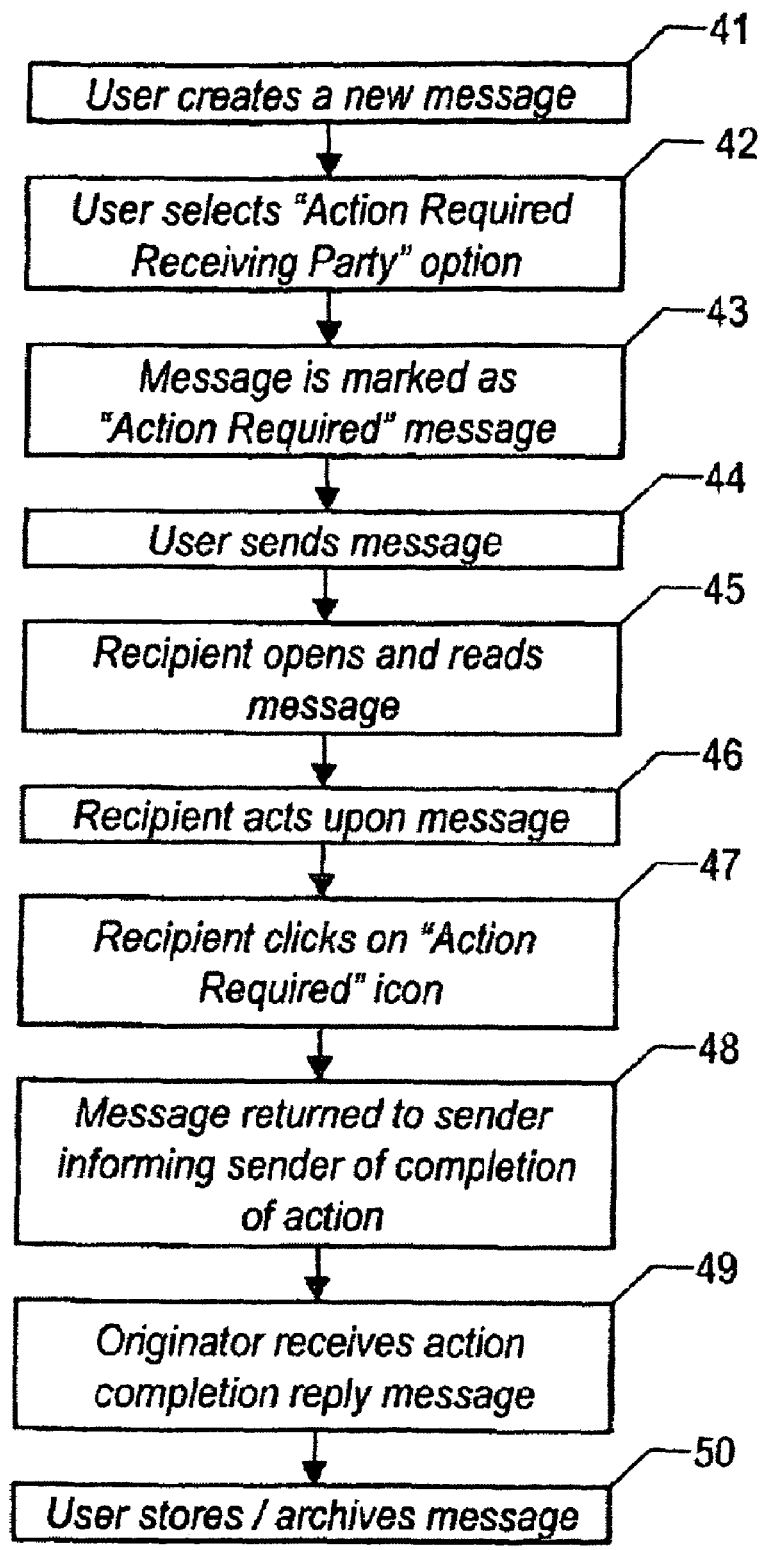
FIG. 9 is a flow diagram of the basic message sender and message recipient interactions in the implementation of the present invention.

FIG. 9 is a flow diagram of the basic message sender and message recipient interactions in the implementation of the present invention. In step 41, the user creates an electronic message in a conventional manner. During the creation of the message, if the user desires to have the message recipient perform some action in accordance with or in response to the message, in step 42, the user can alert the recipient to this fact by clicking the "Action Required" icon 40. In addition to incorporation of the icon on the toolbar of the message, this icon could be included in a pop-up menu under an icon such as "Delivery Options". In the preferred embodiment, when this icon in selected, an action required icon would be embedded in the message and in the in-box of the message sender and/or the in-box of the message recipient. In addition, this icon would be an application hot-link to the response function of the recipient. This clicking of the "Action Required" icon will cause the message to be marked or designated as one that requires to performance of some action. Step 43 implements this marking technique. This technique would incorporate information into the message that will alert the user to the action required by the message sender. At the completion of the message preparation, the user sends the electronic message to the destination location in step 44.

When the message arrives at the destination location, the message recipient opens and reads the message in step 45. The message recipient will then respond to the action required in the message. This response will be in step 46. Upon completion of the required action, in step 47, the message recipient can click the "Action Required" icon appearing in the originally received message, step 48, and cause a return message to be sent to the original message sender. An alternative approach would be for the recipient to separately send a notification message to the message originator that the action has been completed in accordance with the requirement in the originally sent message. In step 49, the notification message is received at the location of the original message. Step 50 then stores the notification of the message completion in a message archive.

Figure 10:
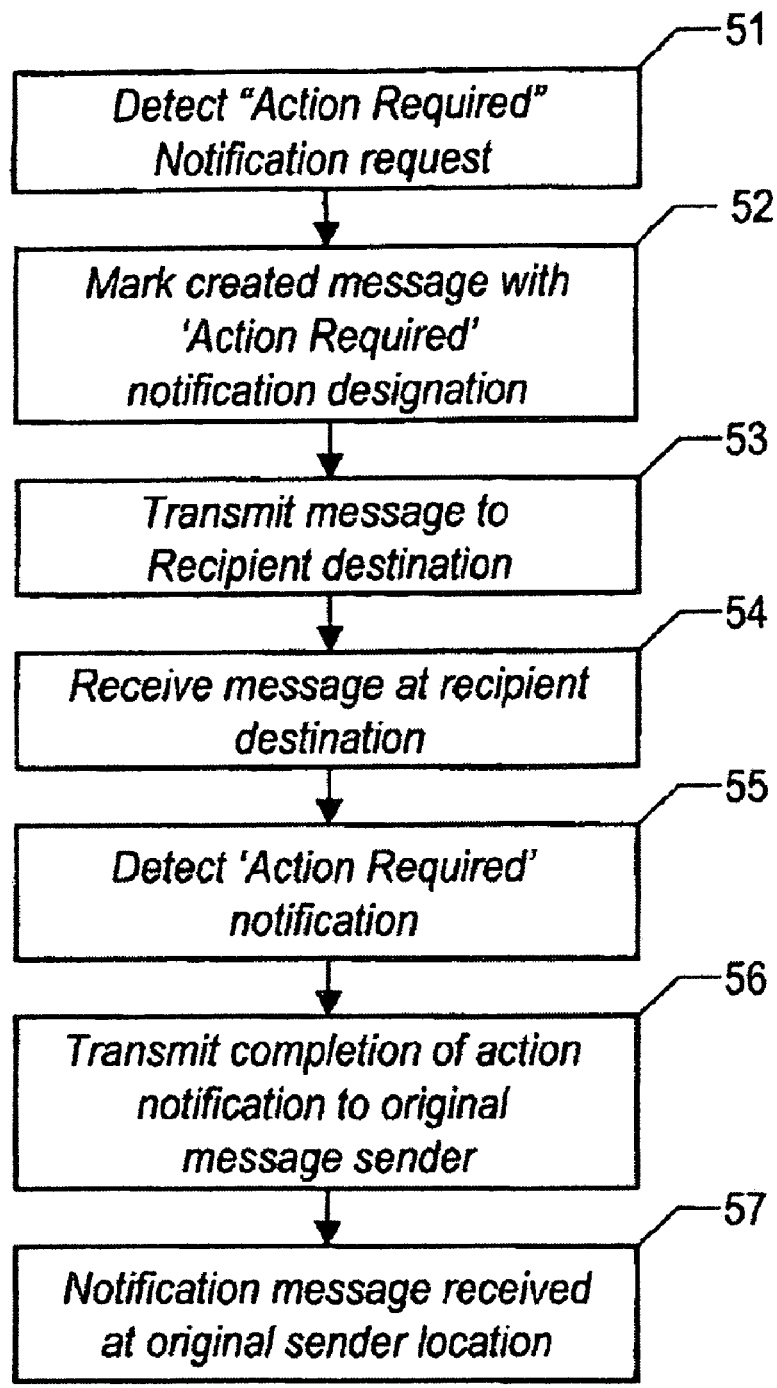
FIG. 10 is a flow diagram of the basic steps in the implementation of the method of the present invention.

FIG. 10 is a flow diagram of the basic steps in the implementation of the method of the present invention. In step 51, there is a detection of an "Action Required Notification Request". In response to the notification request, step 52 marks the created message with an 'Action Required' notification designation. This notification can vary as desired or allowed by a particular system. One example of a notification can be a symbol displayed on the message or an attached note to the message. At the completion of the message-marking step, in step 53 the message is transmitted to the designated destination location. In step 54, the recipient at the destination location receives the message. Step 55 detects the 'Action Required' notification incorporated in the message. This notification can visually displayed such that recipient is immediately aware of the action requirement. If the case when a notification is not a displayed mark such that the recipient would be visually alerted, step 55 would retrieve the information related to the required action and present that information to the message recipient. This notification could some audible notification that would cause to message recipient become aware of the action requirement. In addition, since the response to the required action may not be immediate, the detection of the action requirement could trigger other monitoring and reminder routines that would track the response of the recipient to the action required in the original electronic message. At the completion of the required action, step 56 will transmit a completion of action notification message to the sender of the original message. As previously mentioned, this notification message can be automatically generated or can be manually generated by the recipient. In step 57, the notification message is received at the location of the sender of the original message.

FIG. 11a is a sender's view of an outgoing message. This view is an alternative to the conventional view shown in FIG. 8. This view can be displayed once the user selects the 'Action Require' icon 40. As shown, this view display symbol 'A' that marks this document as one requiring an action to be performed by the message recipient. FIG. 11b shows the display in the in-box of the message sender. As shown, the 'A' would appear with the message entry to indicate that this message has a required action to be performed by the message recipient. The other information in the display indicates the name of the message recipient, the date and time the message was sent and the subject matter of the message. FIG. 11c shows a display of an in-box message at the original message sender location indicating the completion of the required action by the message recipient. This display can also appear at the recipient location. As shown, this message could contain a different mark 'C' that indicates the completion of the action. As with the display in FIG. 11b, the display indicates the name of the message recipient, the date and time the message was sent and the subject matter of the message. As previously mentioned, an automated standard 'action complete' reply is but one of many possible notification methods and this example as illustrated is not intended to limit other possible reply mechanisms.

Figure 12:
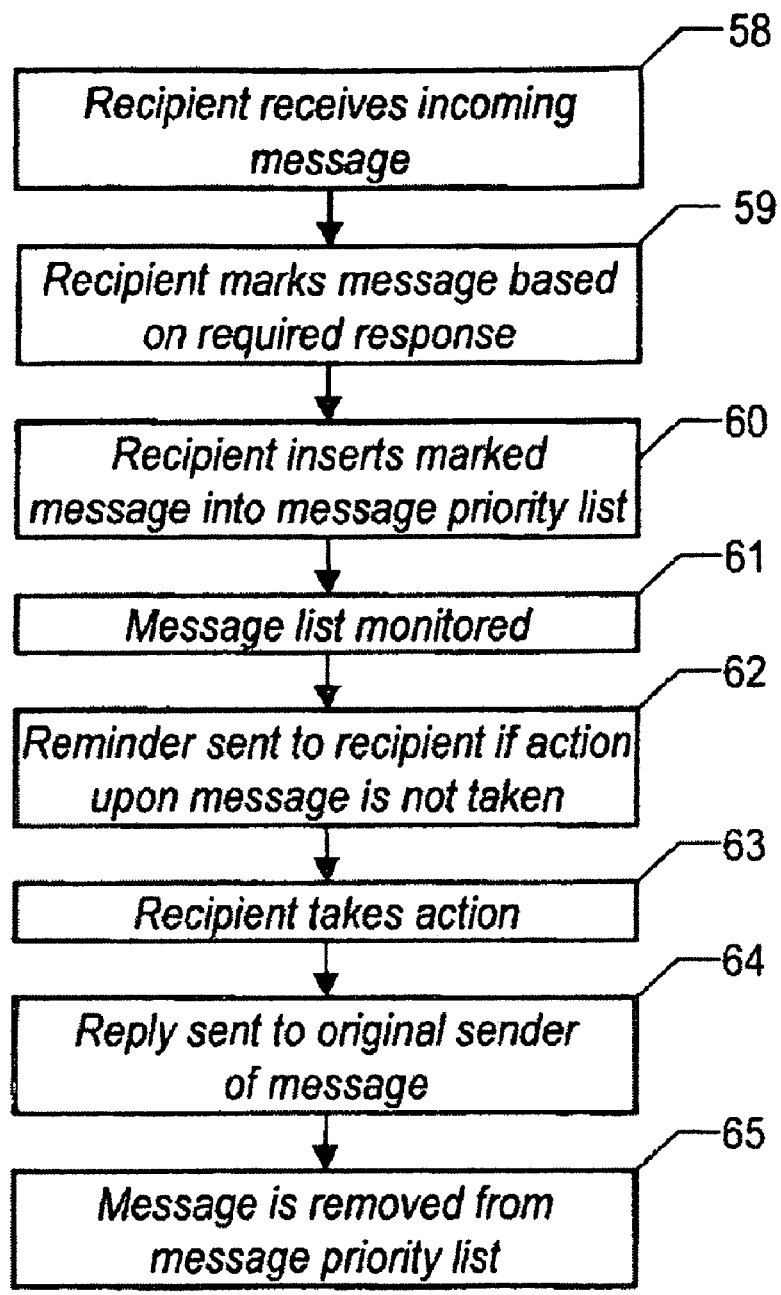
FIG. 12 is an alternate embodiment of the present invention incorporating a technique to monitor the recipient's response to an action required on the received message.

FIG. 12 is an alternate embodiment of the present invention incorporating a technique to monitor the recipient's response to an action required on the received message. In this embodiment, the recipient receives an incoming message in step 58.

The recipient opens message and determines that this requires a follow-up response. This determination could be based on a reading of the contents of the message or the message could contain a marker in accordance with the present invention indicating that actions are required to the received message. At this point, after the determination that an action is required in response to the message, in step 59, the recipient will mark each message that requires a response based on a response priority. FIG. 16 shows various message priority markers. This message categories illustrated in FIG. 16 are U for urgent response required today, W for week, respond required this week, M for respond required this month, and I response at the recipient's leisure.

Referring back to FIG. 12, in step 60, the recipient inserts the marked message into a message priority list. This message would be placed in the list in accordance to the priority mark on the message. In one scheme, the message would be the last message in its marked category. For example, if the massage was marked U for urgent and there were already three urgent messages in the list, this message would be the forth message in the U category to receive attention.

At this point, step 61 will monitor the activity of the messages in the priority list. If an action is not take in accordance with the message within the time frame of the message category, step 62 generates a reminder message that is sent to the recipient. When the recipient does take action in accordance with the message in step 63, a reply message is sent to the original sender of the message, step 64, informing the sender that the action has been taken on the message. Step 65 updates the priority list to reflect the completion of the action on the message. The update process removes the completed message from the priority list.

Figure 13:
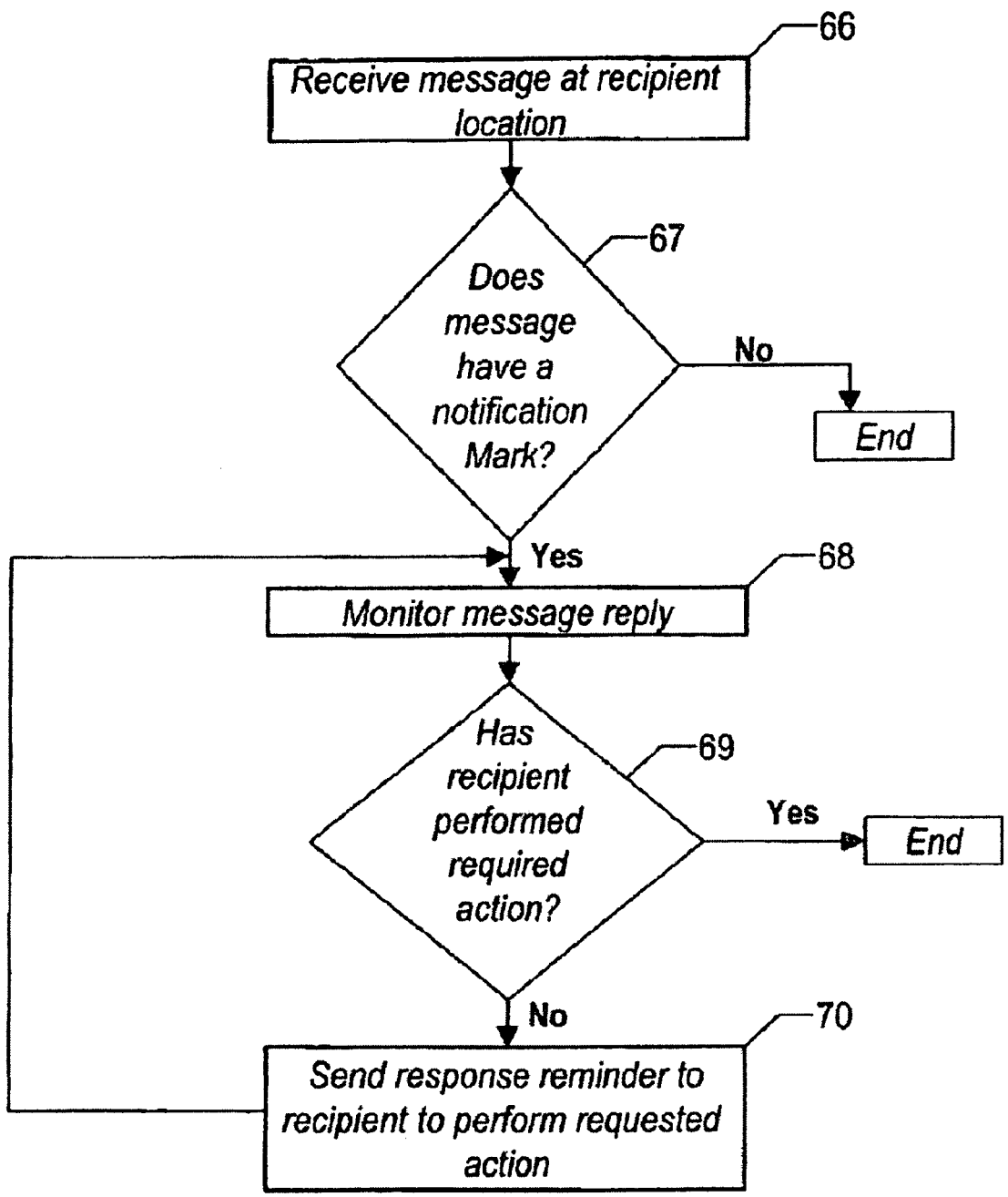
FIG. 13 is a detailed flow diagram of the implementation of a message monitoring technique.

FIG. 13 is a detailed flow diagram of the implementation of a message monitoring technique. This technique is implemented when the sender marks a message as 'Action Required'. In this process, step 66 receives the message at the recipient location. Step 67 makes a determination as to whether a message is marked as 'Action Required'. Since in this process, the recipient is not marking the messages, it is necessary to sort out the marked messages from those not marked. If the determination is that the message is not marked, the process ends. If the determination is that the message is marked, the process moves to step 68, which initiates the monitoring process for the message. The monitoring process can set arbitrary parameters to determine when to check for completion of a required action. This monitoring process will make periodic checks to determine whether the recipient has completed the required action, step 69. These check periods can be arbitrarily created, can be based on information attached to the original message or can be established by the message recipient. If the determination is that the recipient has taken an action on the message the process terminates and a message completion notification transmitted to the original message sender as previously discussed. If in step 69, the determination is that the recipient has not taken action, step 70 sends a response reminder to the recipient that an action is required for that message. The steps 68, 69 and 70 can be periodically repeated until the recipient performs the action required in the message.

Figure 14:
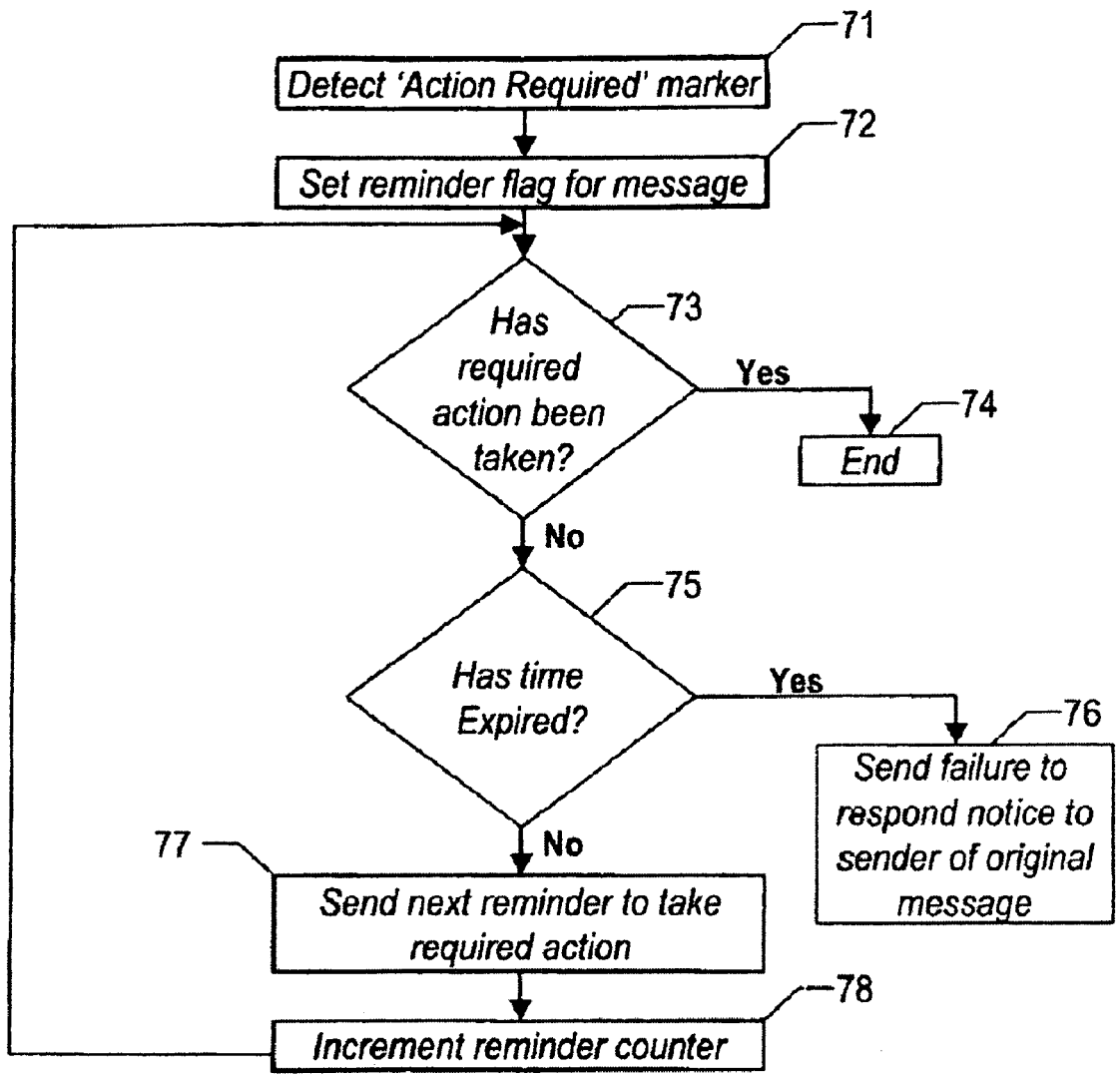
FIG. 14 is a detailed flow diagram of a technique to reminder the message recipient of an action required on the received message.

FIG. 14 is a detailed flow diagram of a technique to reminder the message recipient of an action required on the received message. In this process, incoming messages are checked for an 'Action Required' marker. In step 71, an 'Action Required' marker is detected for an incoming message. After the 'Action Required' marker is detected, a reminder flag is set for that message in step 72. At this point, there are periodic status checks to determine if there has been an action taken by the recipient in response to the message, step 73. As with the process described in FIG. 13, these periodic checks can be based on information contained in the message, or by arbitrary parameters set by the message sender or message recipient. It is possible and preferred that during this same time and prior to the reply due date specified by the sender, the recipient can generate a reply message. If there is a reply by a recipient, the process will terminate at box 74. If however, there is no reply and the first reminder date and time arrives, the method proceeds to step 75, where there is determination of whether there has been the expiration of a total reply time to respond to the message. In this case when the total reply time has expired, a failure to response message is sent to the original sender of the message in step 76. If the total time to respond has not expired, the process moves to step 77 where the next reminder message is sent to the recipient. In order to keep track of the number of reminder messages sent to a particular recipient a counter can be used to count each reminder message transmission. This message transmission count occurs in step 78. As part of this counting process, the counter is initially set to zero. Each time a reminder message is sent, the counter is incremented by one. After the counter is incremented in step 78, the process returns to the period status check in step 73. In an alternate embodiment, the periodic check can occur at points when it is not time to send a reminder. If the original message is sent to multiple recipients, the tracking process of the present invention can be implemented for each recipient. This process would continue for recipient of the message.

The electronic message action requirement features and the message reminder features of the present invention can be added to a legacy email application. In addition, for message reminder processes, a new email database field(s) would likely be required to maintain the date/time index for each such tagged email, and a scanning function would be required to determine when a given note reminder should be activated. Multiple implementation possibilities exist, but in one embodiment, the marking function would be implemented using legacy methods such as those used to mark messages urgent, private, etcetera. The scanning function could be implemented using a tool such as the CRON utility in UNIX systems whereby at a given interval, the marked messages, or a state table representing the marked messages is checked and action taken based on current state data. Finally, disabling the reminder function would remove the mark and the state of a reply to that message would no longer be tracked.

In the implementation of the present invention, all other legacy email functions remain in effect. This invention is an important addition to email functionality providing for a robust closed loop system where it is important to receive responses to specific email notes. It is important to note that while the present invention has been described in the context of a fully functioning data processing system, those skilled in the art will appreciate that the processes of the present invention are capable of being distributed in the form of instructions in a computer readable storage medium.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

The invention claimed is:

1. A method for notifying the recipient of an electronic mail message of a local action required in response to the contents of the electronic mail message, said method comprising:

a processor of a data processing system at a recipient location of the recipient receiving the electronic mail message that had been sent by a message origination location of a sender;

said processor determining at the recipient location that there is a local action required by the recipient in response to the contents of the message;

said processor ascertaining at the recipient location whether the recipient has performed the local action in response to the contents of the message within a specified period of time;

said processor generating a message at the recipient location to remind the recipient to perform the local action in response to the contents of the received message, when said ascertaining ascertains that the recipient has not performed the local action in response to the contents of the received message within the specified period of time; and said processor transmitting an action completion message from the recipient location to the sender to notify the sender that the local action has been performed by the recipient.

2. The method of claim 1, wherein said determining that there is a local action required by the recipient comprises detecting an action-required indicator in the received message.

3. The method of claim 2, wherein said indicator is a marker embedded in the received message.

4. The method of claim 3, wherein the marker embedded in the received message indicates that the local action is required regardless of a type of the required local action.

5. The method of claim 1, said method further comprising before said receiving the electronic mail message:

marking a created message at the message origination location to indicate that the local action is required in response to the contents of the message; and transmitting the message to the recipient location.

6. The method of claim 5, said method further comprising after said processor determining that there is a local action required by the recipient:

said processor determining a priority for the received message requiring the local action, the priority being based on characteristics of a type of the local action required in the message; and said processor inserting the received message into a priority list of messages that require an action.

7. The method of claim 6, said method further comprising:

said processor removing one message from the priority list at a completion of performance of an action in response to the contents of the one message.

8. The method of claim 6, wherein said ascertaining whether the recipient has performed the local action comprises performing periodic checks of the message, the frequency of the checks being based on a category of the message.

9. A computer program product comprising a computer readable storage medium storing instructions for performing a method, by being executed by a processor of a data processing system at a recipient location of a recipient of an electronic mail message, for notifying the recipient of the electronic mail message of a local action required in response to the contents of the electronic mail message, said instructions comprising:

instructions for the recipient location receiving the electronic mail message that had been sent by a message origination location of a sender;

instructions for determining at the recipient location that there is a local action required by the recipient in response to the contents of the message;

instructions for ascertaining at the recipient location whether the recipient has performed the local action in response to the contents of the message within a specified period of time;

instructions for generating a message at the recipient location to remind the recipient to perform the local action in response to the contents of the received message, when said ascertaining ascertains that the recipient has not performed the local action in response to the contents of the received message within the specified period of time; and instructions for transmitting an action completion message from the recipient location to the sender to notify the sender that the local action has been performed by the recipient.

10. The computer program product of claim 9, wherein said instructions for determining that there is a local action required by the recipient comprise instructions for detecting an action-required indicator in the received message.

11. The computer program product of claim 10, said instructions further comprising, for being executed after execution of said instructions for determining that there is a local action required by the recipient:

instructions for determining a priority for the received message requiring the local action, the priority being based on characteristics of a type of the local action required in the message; and instructions for inserting the received message into a priority list of messages that require an action.

12. The computer program product of claim 11, said instructions further comprising instructions for removing one message from the priority list at a completion of performance of an action in response to the contents of the one message.

13. The computer program product of claim 12, wherein said instructions for ascertaining whether the recipient has performed the local action comprises instructions for performing periodic checks of the message, the frequency of the checks being based on a category of the message.

14. The computer program product of claim 9, said instructions further comprising instructions for displaying a marker indicating that the local action is required for the received message.

15. A method for notifying the recipient of an electronic mail message of a local action required in response to the contents of the electronic mail message, said method comprising:

a processor of a data processing system at a recipient location of the recipient receiving the electronic mail message that had been sent by a message origination location of a sender;

said processor determining at the recipient location that there is a local action required by the recipient in response to the contents of the message;

said processor performing periodic message reply checks to ascertain whether the recipient has performed the local action in response to the contents of the message within a specified period of time; and after said performing said periodic message reply checks has ascertained that the recipient has not performed the local action, said processor generating a message at the recipient location to remind the recipient to perform the local action in response to the contents of the received message.

16. The method of claim 15, said method further comprising after said determining that there is a local action required by the recipient, said processor identifying a set response time limit.

17. The method of claim 16, said method further comprising after said performing periodic message reply checks and before said generating the message, said processor determining whether the identified response time limit has expired.

18. The method of claim 17, said method further comprising said processor sending a failure to respond notice to the sender when said determining whether the identified response time limit has expired has determined that the identified response time limit has expired.

* * * * *